(12) United States Patent
Homem et al.

(10) Patent No.: US 12,523,925 B2
(45) Date of Patent: Jan. 13, 2026

(54) CAMERA HEAD ASSEMBLY

(71) Applicant: Robert Bosch GmbH, Stuttgart (DE)

(72) Inventors: Francisco Homem, Eindhoven (NL); Gandharva Sati, Eindhoven (NL)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 18/147,844

(22) Filed: Dec. 29, 2022

(65) Prior Publication Data
US 2023/0213843 A1    Jul. 6, 2023

(51) Int. Cl.
*G03B 17/56* (2021.01)

(52) U.S. Cl.
CPC .................................. *G03B 17/561* (2013.01)

(58) Field of Classification Search
CPC ...................... G03B 21/145; G03B 2215/0517
See application file for complete search history.

(56) References Cited

U.S. PATENT DOCUMENTS

| | | | | |
|---|---|---|---|---|
| 5,115,263 A * | 5/1992 | Bernhardt | ........ | G08B 13/19619 348/335 |
| 5,455,625 A * | 10/1995 | Englander | ............ | F16M 11/048 348/E5.025 |
| 7,520,686 B2 * | 4/2009 | Droege | .................. | G03B 17/02 348/148 |
| 2004/0114919 A1 | 6/2004 | Rife | | |
| 2011/0286735 A1 | 11/2011 | Tremblay | | |
| 2020/0209720 A1 * | 7/2020 | Grim | ...................... | H04N 23/51 |
| 2021/0141290 A1 * | 5/2021 | Bull | ........................ | H05K 1/148 |

FOREIGN PATENT DOCUMENTS

| | | |
|---|---|---|
| EP | 1030278 A1 | 8/2000 |
| EP | 2201768 B1 | 7/2018 |

OTHER PUBLICATIONS

European Patent Office Action for Application No. 22150014.3 dated Feb. 12, 2025 (6 pages).

* cited by examiner

*Primary Examiner* — Noam Reisner
(74) *Attorney, Agent, or Firm* — Michael Best & Friedrich LLP

(57) ABSTRACT

A camera head assembly for a camera, a camera including the camera head assembly and a method for mounting the camera head assembly. The camera head assembly includes a camera housing and at least one tray, wherein the housing includes at least one reference surface on its inner surface, and the at least one tray includes at least one reference surface corresponding to the reference surface of the housing, the least one reference surface of the at least one tray preferably being produced by cutting out, wherein the at least one tray is arranged inside the housing such that the at least one reference surface of the housing and the at least one reference surface of the at least one tray abut each other, and such that the tray is clamped between a first surface of the housing and a second surface of the housing.

15 Claims, 7 Drawing Sheets

CAMERA HEAD ASSEMBLY

BACKGROUND

The present invention relates to a camera head assembly comprising a camera housing and a tray carrier mounted therein, a camera including the camera head assembly and a method for mounting the camera head assembly.

Surveillance cameras are subjected to extensive loads and accelerations and their housings need to be water proof. PCBA and lens fixations and housing interfaces need to take these loads into account. Typically, there is the need to dissipate heat loads coming from processing PCBA's and other PCBAs to avoid over-heating of components. Such camera-heads can be manufactured in a thermally conductive alloy typically aluminium alloys. Effective and direct heat dissipation to the highest external surface-area part maximizes the operating temperature of the product, the camera-head.

EP 2 201 768 B1 shows a surveillance camera-housing system that dissipates heat from components mounted to heatsink brackets having flanges that press against inner walls of a camera housing.

SUMMARY

The disclosure provides a camera head assembly comprising a camera housing and a tray carrier mounted therein, a camera including the camera head assembly and a method for mounting the camera head assembly are disclosed. Further preferred developments are described by the description below.

The proposed invention allows to fixate trays that can carry printed circuit board assemblies (PCBAs) with heat loads that need to be dissipated and/or optical blocks inside an extruded profile serving as housing such that the heat load is dissipated efficiently while ensuring sufficient positioning robustness and accuracy of the trays to a front or back-cover attached to the housing.

Extruded profiles have low positional tolerance of features relative to its sections and also considerable straightness and twisting deviations along their length when compared to housings using die cast methods. By placing positional reference (reference surfaces) inside the extruded profile close to the back or front of the housing and interfacing the cut-out surfaces of the tray in all spatial directions with this machined reference surfaces, an accurate position of each tray with respect to the front or back cover can be provided. The decision whether the reference surfaces are placed with reference to the back or the front cover is made depending on the type of the tray. If the components carried by the tray are connected to the back cover, the reference surfaces are placed close to the back cover and vice versa.

The machined references of the housing that interface with the trays are machined using common references used for locating the back or front cover (for example, the thread holes or pin holes). In this way, there is a precise chain of locating tolerances between the tray and the back or front cover. This results in sufficient positioning tolerance between the PCBA's electrical connectors and the opening in the back cover accommodating the electrical connectors. Thus, a user can access the front cover, the PCBAs and a potential polarizing filter without affecting the PCBAs and the optical block to replace/adjust/service one of this components.

By providing tight positional tolerance of the trays to the back or front cover, it is possible to install the trays from the same side, which makes the cabling simpler and shorter, causing less signal degradation and eases cable management needs. It also allows the connection of the cables to be performed outside the housing where there is good access.

According to the invention, it is provided a camera head assembly for a camera comprising a camera housing and at least one tray. The housing comprises at least one reference surface on its inner surface, and the at least one tray comprises at least one reference surface. Preferably the least one reference surface of the at least one tray being produced by cutting out, preferably corresponding to the reference surface of the housing. The tray is arranged inside the housing by means of the reference surface of the housing and the corresponding reference surface of the tray abutting each other. Providing a reference surface on the inner surface of the housing and a corresponding cut-out reference surface on the tray allows for mounting the tray in a predetermined position. In other words, a precise positioning of the tray inside the housing can be achieved by aligning a cut-out reference surface (e.g. an edge) of the tray with a reference surface of the housing.

Furthermore, the tray is clamped between a first surface and a second surface of the housing. Especially, the tray or at least one heat transferring element attached to the tray is closely connected to the first surface, which allows for effective direct heat dissipation of heat caused by the operation of PCBAs, or lenses attached to the tray. Furthermore, springs or similar parts to ensure thermal contact to the housing are avoided, which simplifies installation and replacement of the tray.

According to an embodiment, the housing comprises an extruded profile. This enables high design freedom and good usage of space when large PCBAs need to be placed inside the housing as well as modularity of the PCBA and lens, since an extruded profile can be cut to different lengths. Additionally, extruded profiles allow for less time-to-market and less tool cost than a housing made by die cast.

Advantageously, the tray comprises a sheet metal part. Sheet metal parts can be produced with low tolerances and, therefore, positioned in a housing comprising/being an extruded profile with high accuracy. Sheet metal parts can be easily cut out.

According to an embodiment, the tray comprises a clamping means for clamping it between the first and the second surface of the housing. Preferably, the clamping means comprises a stud-weld-screw on which a nut is seated. Instead of a stud welding screw the screw could be a normal countersunk head screw with counter-nut plus the untightening nuts.

According to an embodiment, the tray comprises a fixation means for fixing it to the housing. The fixation means may preferably comprise a bend/curved tab attached to one side of the tray and having a hole through which it may be secured to a side of the housing with a screw.

According to an embodiment, the clamping means is arranged on a side of the tray opposite a side at which the fixation means is arranged. This means that the clamping/fixation means are provided at opposite sides of the tray so that a uniform connection with the housing is ensured.

According to an embodiment, the tray comprises a bend providing an opening through which at least one electrical connector of the camera is guided. This enables the tray to be installed from one side (e.g., from the back of the housing) allowing for less cable length and easing assembly during production.

According to an embodiment, the tray is configured to carry at least one printed circuit board assembly and/or at least one optical block of the camera. The optical block may at least include a lens bracket and one or more lenses.

According to an embodiment, the housing comprises at least one rib extending in longitudinal direction (Z-direction) of the housing on its inner surface, and the reference surface is disposed on the rib. Using the rib to attach the reference surface(s) has the advantage of providing enough material to create a flat surface that can be aligned with a surface/edge of the tray.

According to an embodiment, the housing comprises a positioning key for prefixing the tray in the predetermined position, and the reference surface is disposed on the positioning key. This allows for further improvement regarding the positioning of the tray.

According to an embodiment, the camera head assembly further comprises a back cover attached to the housing at a first predetermined position, and a front cover attached to the housing at a second predetermined position, wherein the position of the reference surface is related to the first predetermined position and/or related to the second predetermined position. The first and second predetermined positions of the back and front covers can preferably be provided by a predetermined hole pattern on each side of the housing. The front cover and the back cover can be fixed with screws in the respective hole patterns. Preferably, the position of the reference surface may be related to one or more holes of the predetermined hole pattern on the front or back side of the housing.

According to an embodiment, the back cover comprises an opening for accommodating the electrical connector and a lid attached to the outer side of the back cover for covering the opening in the back cover, the lid comprising at least one connection socket providing access to the electrical connector.

By positioning the reference surface in relation to a predetermined position of the back and/or front cover, a precise chain of locating tolerances between the tray and the back or front cover is provided. This results in sufficient positioning tolerance between the electrical connector attached to the tray and the opening in the back cover accommodating the electrical connectors. Equipping the lid with at least one connection socket allows easy and convenient electrical connection of external devices to the camera.

According to the invention, it is further provided a camera comprising the camera head assembly described above, and preferably a swivel mechanism, which is mechanically connected to the camera head assembly for orientating the latter, and a base, which is mechanically connected to the swivel mechanism for attaching the camera at a support structure.

According to the invention, it is further provided a method for installing the camera head assembly described above, the method comprising arranging the at least one tray inside the housing by abutting the at least one reference surface of the housing to the corresponding at least one reference surface of the at least one tray, and clamping the at least one tray between the first and the second surface of the housing. Thus, the tray is pre-positioned in a predetermined position using the reference surfaces before it is fixed to the housing by clamping it between the first and the second surfaces. Preferably the least one reference surface of the at least one tray being produced by cutting out, preferably corresponding to the reference surface of the housing.

The method makes it possible to determine the axial position of the tray along the housing independently of the presence of the front and/or back cover. This means that the assembly of the tray does not depend on the assembly of the front and/or back cover. In addition, the tray containing the PCBAs and the heat transferring elements can be easily placed in the housing so that the risk of damage to the components is low. In addition, the PCBAs can be serviced without special tools, jigs or high forces. The method also ensures precise positioning of the PCBAs and optical block with respect to the back and/or front cover, allowing convenient access for electrical connections from the back and maximizing the usable field of view of the lens.

BRIEF DESCRIPTION OF THE DRAWINGS

Further advantages and embodiments of the invention can be seen in the following description and the accompanying figures. The invention is illustrated schematically by means of examples in the figures and is described below with reference to the figures.

DETAILED DESCRIPTION

Figure 1:
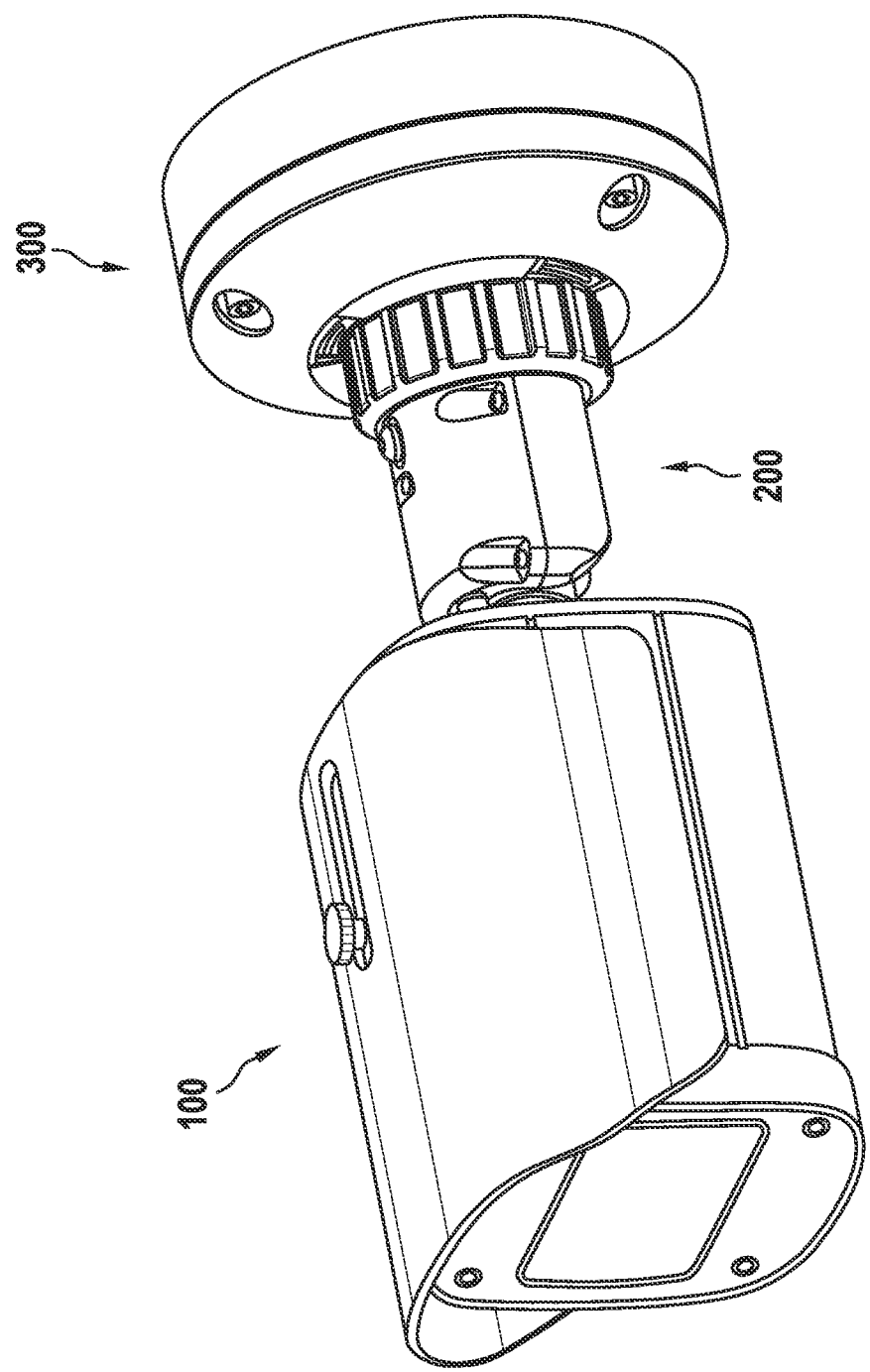
FIG. 1 shows an example of a surveillance camera according to a preferred embodiment of the present invention in a perspective side view.

FIG. 1 depicts a preferred embodiment of a camera according to the present invention. The camera comprises a camera head assembly 100 according to a preferred embodiment of the invention, a swivel mechanism 200 that is mechanically connected to the camera head assembly 100 and allows for orientating it in a desired position. A base 300 for attaching the camera to a support structure is connected to the swivel mechanism.

Figure 2:
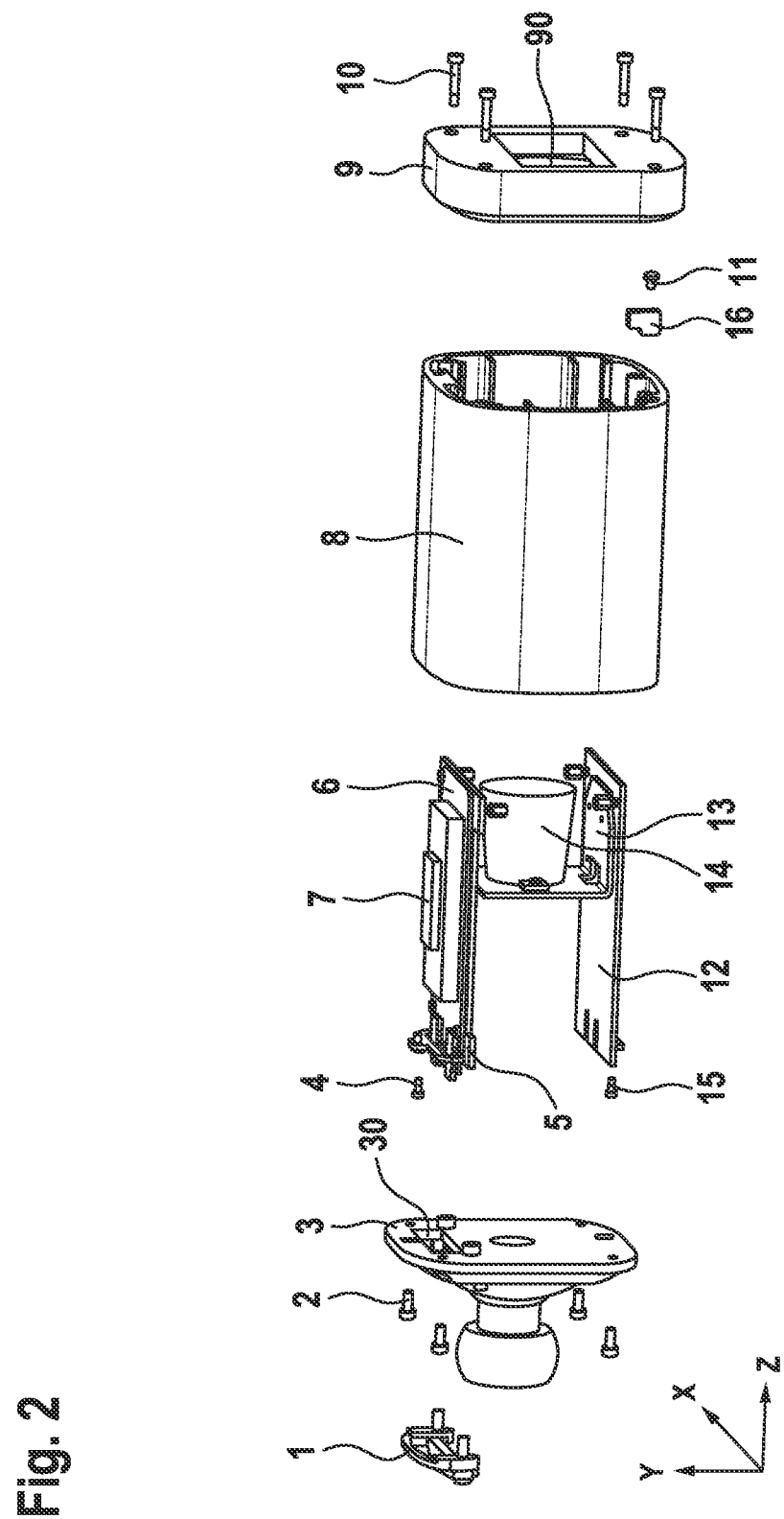
FIG. 2 shows an example of the various parts of the camera head assembly according to a preferred embodiment of the invention in an exploded drawing.

FIG. 2 shows an example of the various parts of the camera head assembly 100 according to a preferred embodiment of the invention in an exploded drawing. The depicted camera head assembly 100 includes a housing 8 in which a tray 5 carrying PCBAs 6 (PCBA tray 5) and a tray 12 carrying an optical block 13, 14 (optics tray 12) is disposed. The PCBA tray 5 additionally comprises a heat transferring element 7, which is arranged between the PCBAs 6 and a heat dissipating surface 81 of the housing 8. The depicted optical block includes a lens bracket 13 and a lens 14 mounted at the lens bracket 13.

Both trays 5, 12 are fixed to a back side of the housing with a screw 4, 15, wherein the optics tray 12 is positioned and pre-fixated inside the housing 8 with a positioning key 16 fixed to a front side of the housing 8 by a screw 11. Details of the positioning and fixing of the trays 5, 12 are given below in connection with the following FIGS. 3a to 7. A back cover 3 is attached by four screws 2 to the back side of the housing 8. The back cover 3 has an opening 30 for accommodating electrical connectors 61 of the PCBA 6, which is covered with a lid 1 screwed to the back cover 3. On the opposite side, a front cover 9 is attached to the housing with four screws 10 that contains a viewing window for the lens 14.

The invention is described below in a coherent and comprehensive manner with reference to the figures.

Figure 3A:
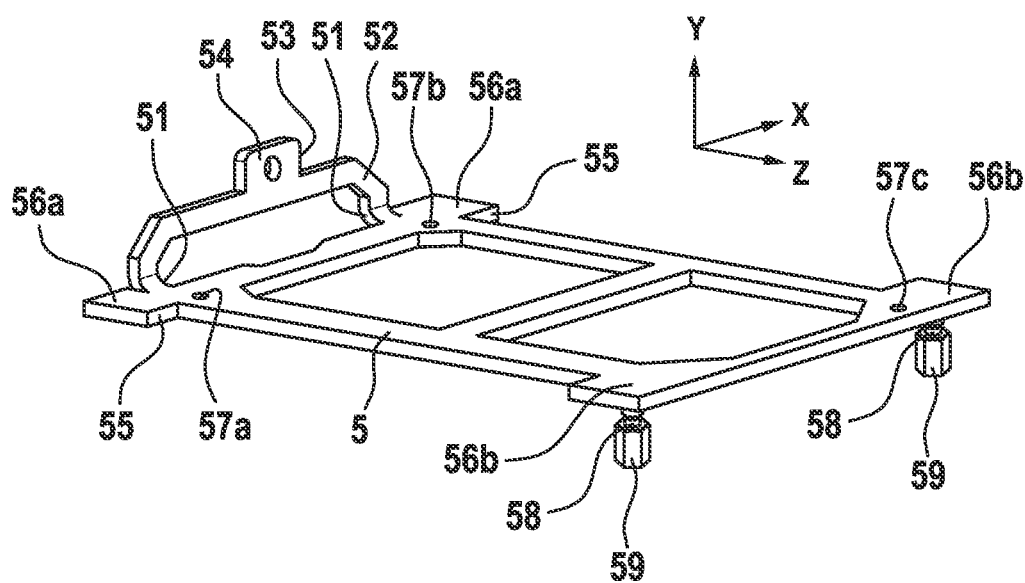
FIG. 3a shows an example of a tray for carrying PCBAs according to a preferred embodiment of the invention in a perspective side view.
Figure 3B:
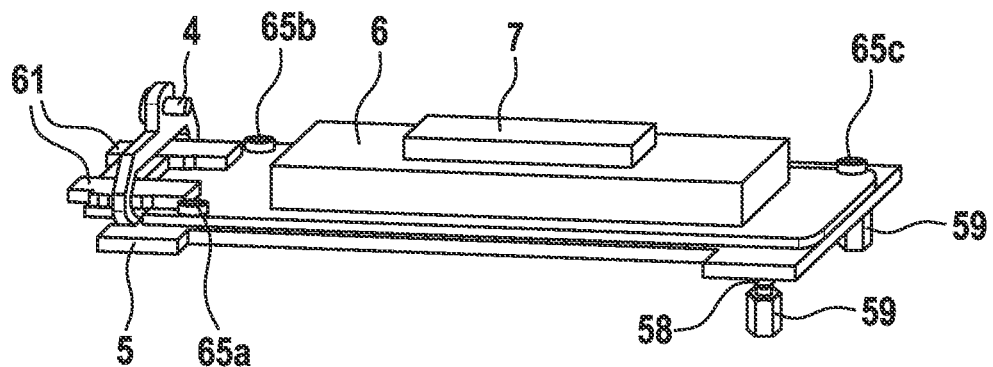
FIG. 3b shows the tray of FIG. 3a equipped with a PCBA and a heating connecting element in a different perspective side view.
Figure 4:
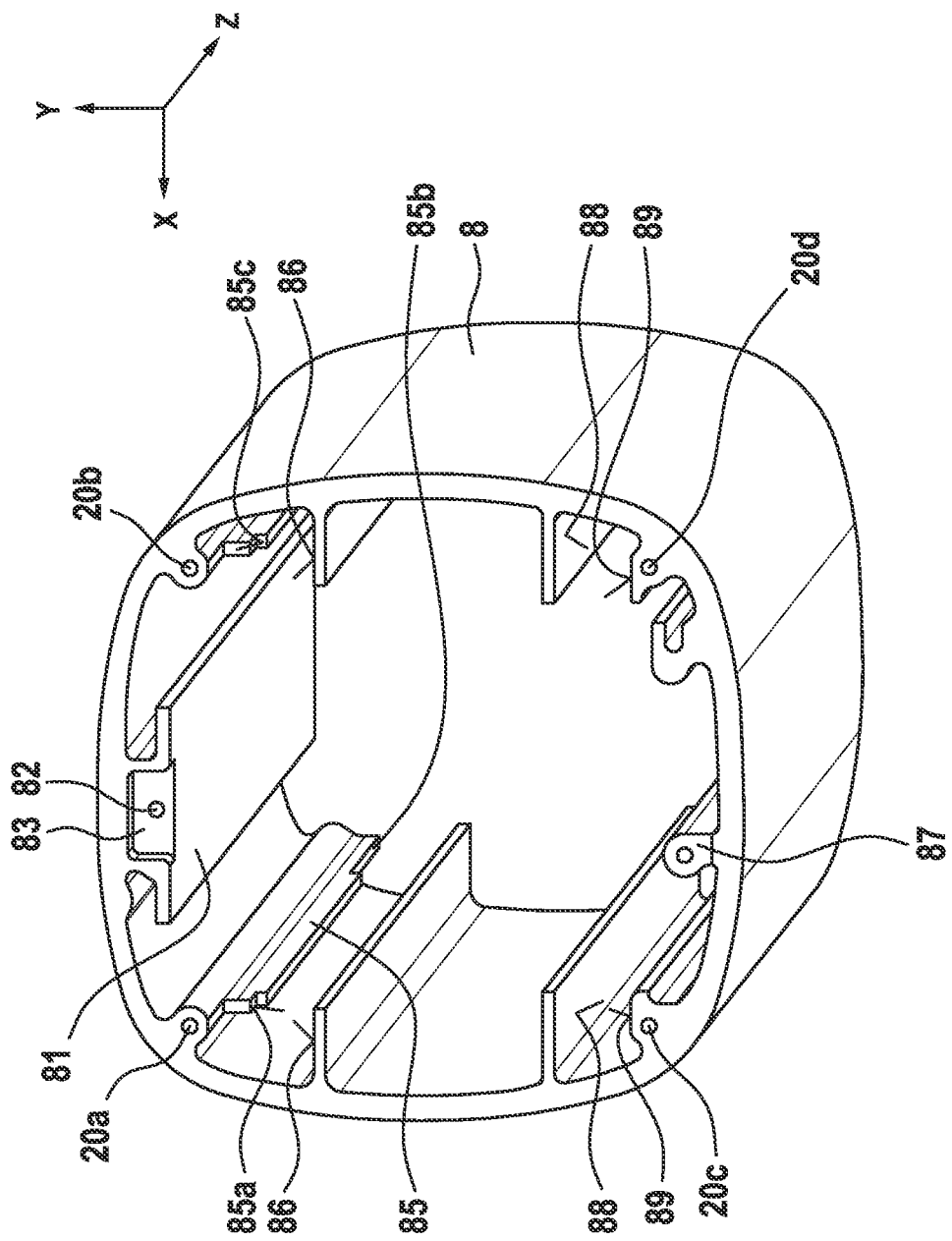
FIG. 4 shows an example of a housing according to a preferred embodiment of the invention in a perspective back view.
Figure 5A:
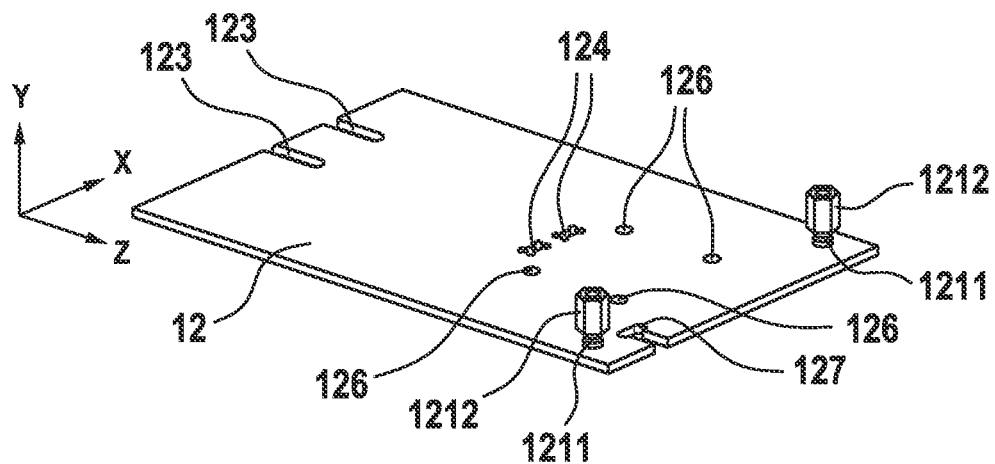
FIG. 5a shows an example of a tray for carrying an optical block according to a preferred embodiment of the present invention in a perspective side view.
Figure 6:
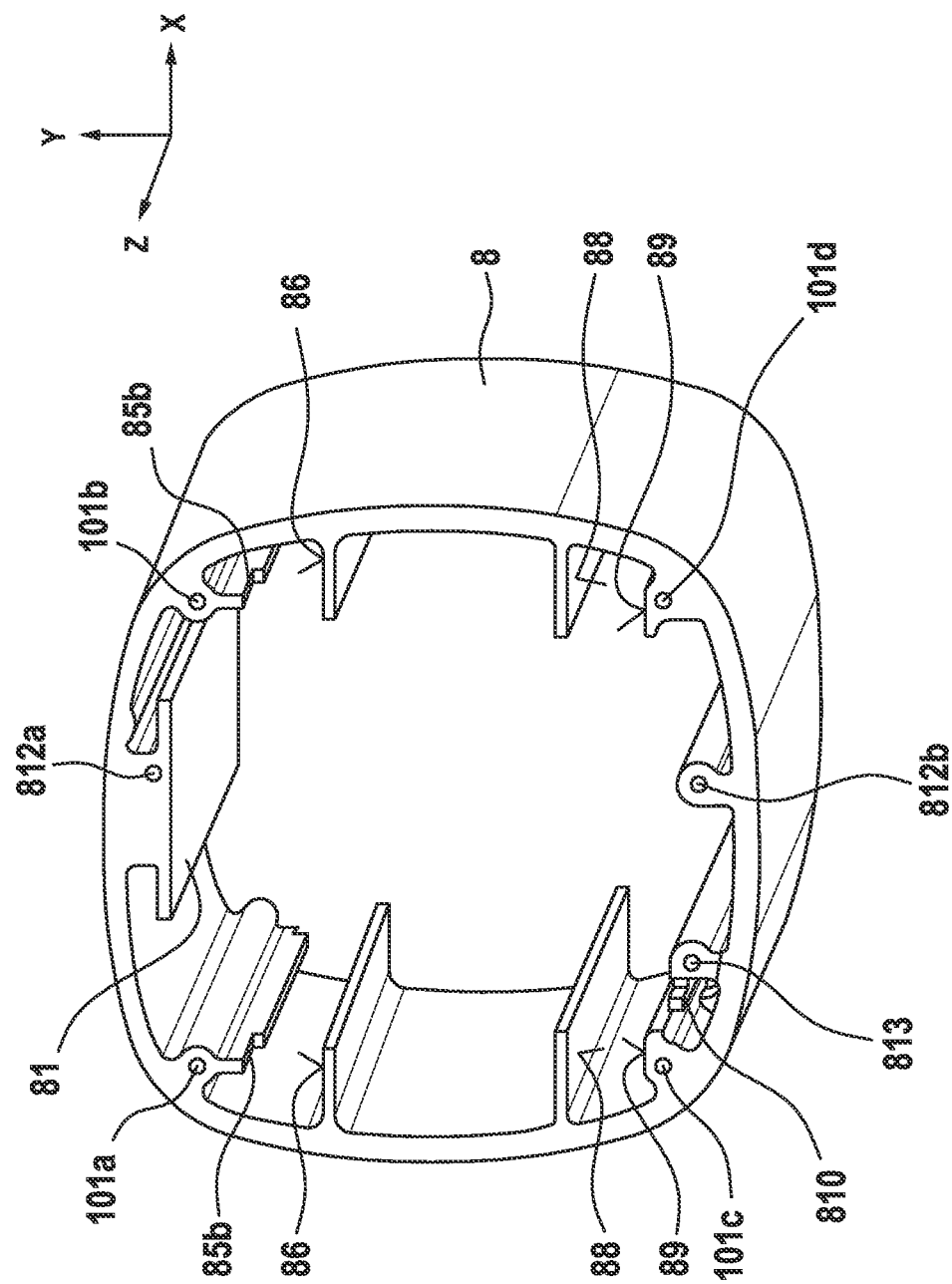
FIG. 6 shows the housing of FIG. 4 in a perspective front view.
Figure 7:
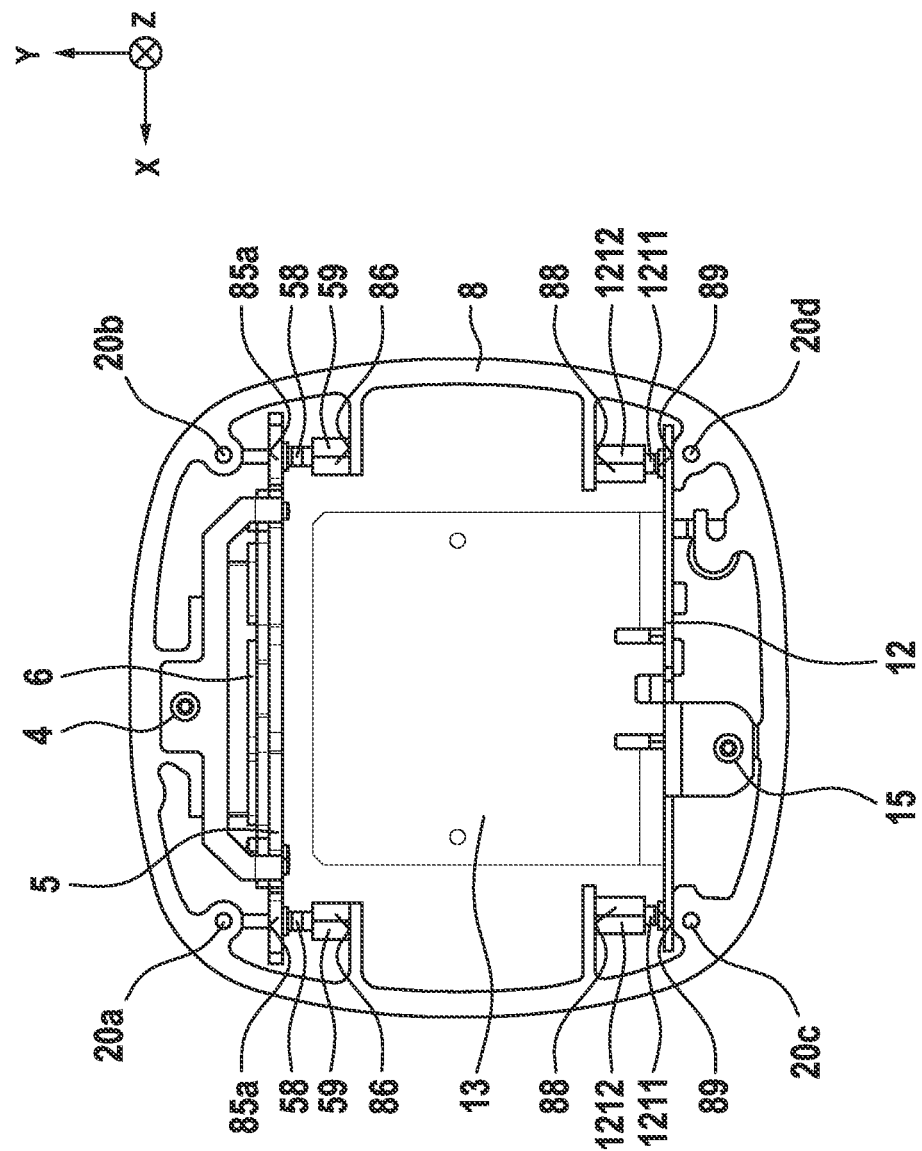
FIG. 7 shows the housing of FIGS. 4 and 6 in a back view, with the PCBA tray as shown in FIG. 3b and the optics tray as shown in FIG. 5b installed in the housing.

A preferred embodiment of the invention as described in the following in reference to the figures relates to mounting a tray 5 carrying PCBAs 6 with heat dissipation needs as shown in FIG. 3b, or an optical block 13, 14 as shown in FIG. 5a, inside an extruded profile serving as a housing 8, as shown in FIGS. 4, 6 and 7.

The camera head assembly 100 according to the invention takes advantage of the small manufacturing tolerances of cut-outs in sheet metal parts used as trays 5, 12 forming the reference surfaces of the tray, and machined reference surfaces 83, 85a, 85b, 85c, 810a in the housing 8 of the camera head assembly 100. The reference surfaces 83, 85a, 85b, 85c, 810a are arranged in the housing 8 in such a way that the trays 5, 12 or the heat transferring elements 7 attached to the trays 5, 12 are firmly connected to the surfaces 81, 89 which allow heat dissipation (cf. FIGS. 4, 6 and 7). In other words, the trays are arranged inside the housing 8 such that they are in contact with the heat dissipating surfaces 81, 89 of the housing 8.

The reference surfaces 83, 85a, 85b, 85c, 810a in the housing 8 are positioned relative to fastening holes 20a-20d, 101a-101d (hole pattern) of the back and front cover 3, 8 and relative to the back or front sides of the housing 8. The reference surfaces 83, 85a, 85b, 85c, 810a are further positioned in close proximity to the back or front sides of the housing 8, to avoid an influence of the straightness and twisting tolerances along the extruded profile forming the housing 8.

The PCBA tray 5 and the optics tray 12 are each equipped with a bend 52, 121 at the back to fixate the trays 5, 12 to the housing 8, as well as with pre-cut-out surfaces to interface with surfaces on the back and front side of the housing 8 (cf. FIGS. 3a, b and 5a, b). Typically, the PCBA tray 5 needs to have tight positional tolerance to the back cover 3 and to the heat dissipating surface 81, and the optics tray 12 needs to have tight positional tolerance to the front cover 9, where the light goes through a viewing window 90. Since both trays 5, 12 are to be assembled from the back side of the housing 8, the approach to precisely locate the trays 5, 12 to the back (PCBA tray 5) or front side (optics tray 12) follows a different approach.

In the case of the PCBA tray 5, the tray 5 equipped with a PCBA 6 and a heat transferring element 7 is first manually positioned in vertical direction (Y-direction) with its top surface 56a onto the reference surface 85a. Subsequently, the tab 54 of the bend 52 is inserted into the corresponding recess 83 on the back of the housing 8 and fastened with a screw 4 through a hole in the tab 54 in a thread 82 (cf. FIGS. 3a and 4). When positioning the PCBA tray 5, it is also important to ensure that the top surface 56b of the tray 5 facing the front of the housing 8 is in contact with the reference surface 85b (cf. FIGS. 3a and 4).

The position in longitudinally direction of the housing 8 (Z-direction) is achieved using the flexibility of the PCBA tray 5 in that direction, due to the bend 52 and a nominal gap between the bend 52 and the thread 82 in Z-direction before the screw 4 is tightened. By tightening the screw 4 a contact between the reference surface 85c and a corresponding edge of the tray 55 (as reference surface) is achieved defining the position of the PCBA 6 and the head connecting element 7 (cf. FIGS. 3a, 3b and 4). The side surfaces 53 of the bend 52 of the PCBA tray 5 (cf. FIG. 3a) are cut before the bend 52 is made and are accurate enough to provide a positional reference in cross direction (X-direction) by interfacing with the recess 83 on the back side of the housing 8.

The PCBA tray 5 is then clamped in Y-direction at the opposite side of the housing (front side) by untightening two nuts 59, pre-assembled onto stud-weld-screws 58 against a clamp surface 86 ensuring the upper surface 56b of the tray 5 is interfacing with the reference surface 85b (cf. FIGS. 3a, 4 and 7). Instead of a stud-weld-screw the screw could be a normal countersunk head screw with counter-nut plus the untightening nuts.

The PCBA 6 can be fixated to the tray 5 via three screws 65a-65c screwed into three holes 57a-57c of the tray 5 (FIG. 3b) and be accurately positioned to the housing 8 so that the electrical connectors 61 can pass through the opening 51 provided by the bend 52 and align with the opening 30 on the back cover 3 (cf. FIG. 3a).

The back cover 3 is fastened to the housing 8 by means of the screws 2, which are screwed into the fastening holes 20a to 20d. The fastening holes 20a-20d are positioned relative to the heat dissipating surface 81 and to the reference surfaces 85a, 83 for positioning the PCBA tray 5. The fact that the PCBA tray 5 is evenly connected to the housing (via the screw 4 at the back and via the clamping means 58, 59 at the front), ensures that the thermal connection element 7 has a correct compression ratio with respect to the heat dissipating surface 81 and ensures sufficient heat flow to the housing 8. In other words, the PCBA tray 5 is arranged inside the housing 8 such that it is in contact with a first surface 85b and clamped against a second surface 86, to ensure adequate heat dissipation from the PCBA 6 arranged on the tray 5.

In the case of positioning the optics tray 12 inside the housing 8, it is important to define its position relative to the front side of the housing 8, in order to maximize the field of the lens view angle.

Figure 5B:
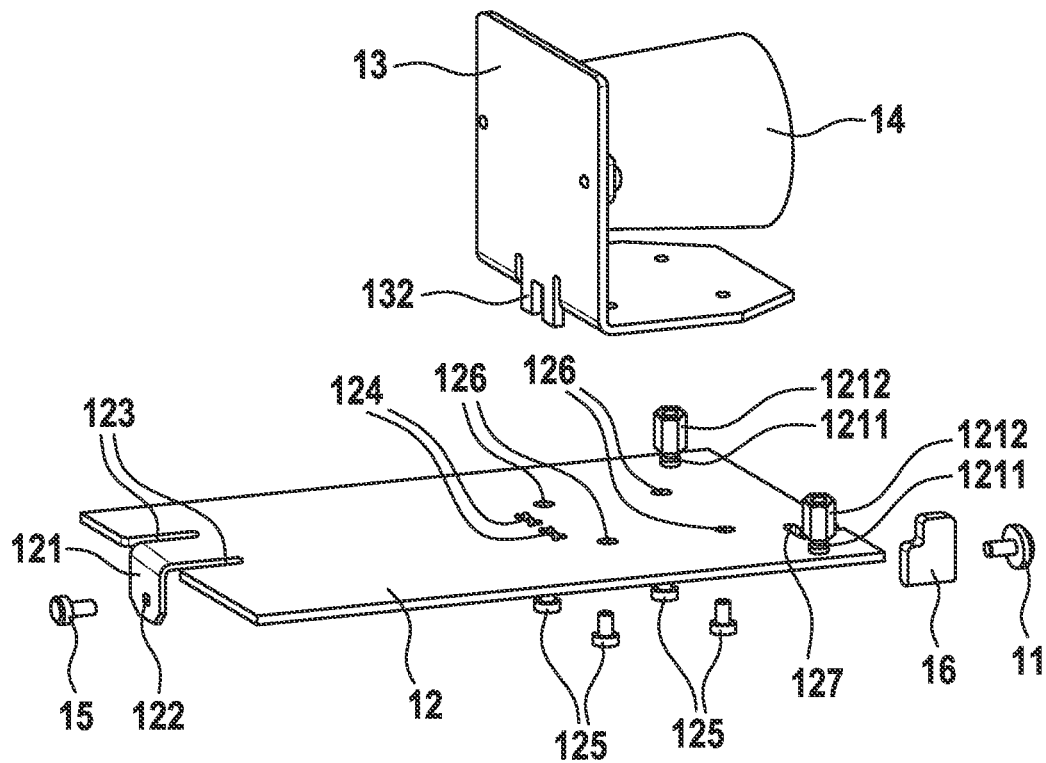
FIG. 5b shows the tray of FIG. 5a equipped with an optical block in a different perspective side view.

After positioning the optics tray 12 on the heat dissipating surface 89 from the back side of the housing 8 (cf. FIG. 4), the correct position of the tray 12 with regard to the front side can be achieved by using a positioning key 16 (as reference surface), which relates the position of a cut-out slot 127 (as reference surface) on the front side of the optics tray 12 to a slot 810 located on the front side of the housing 8 in X- and Z-direction (cf. FIGS. 5a, 5b and 6). Furthermore, the positional key 16 relates the position in Z-direction of the tray 12 to the front of the housing 8 by tightening a screw 15. Tightening the screw 15 ensures that the positional key 16 is in contact with the slot 810 of the housing and the slot of the tray 127 in Z-direction. Thus, a pre-fixation of the optics tray 12 in the housing 8 is achieved.

To attach the tray 12 to the back side of the housing 8, the bend 121 of the optical tray 12 is screwed with the screw 15 through the hole 122 into the thread 87 (cf. FIGS. 4 and 5a). There is a small nominal gap between the bend 121 of the optical tray 12 and the thread 87, so that tightening the screw 11 while taking advantage of the flexibility of the tray in the Z-direction due to the bend 121 and the slots 123 further increases the contact of the position key 16 with the slots 810, 127 in the Z-direction.

The optics tray 12 is then clamped in Y-direction at the opposite side of the housing (front side) by untightening two nuts 1212, pre-assembled onto stud-weld-screws 1211 against a clamp surface 88, to achieve robust positioning and suitable heat dissipating contact between the surface 89 of the housing 8 and the optics tray 12 (cf. FIGS. 5a, 5b, 6 and 7). Thus, the optics tray 12 is clamped between the surface 89 as a first surface and the clamp surface 88 as a second surface.

Before the optics tray 12 is positioned inside the housing 8 in the way described above, the lens 14 is mounted on the lens bracket 13 which is then positioned and pre-fixated on the optics tray 12 by two lugs 132 inserted into cut-out holes 124 provided on the surface of the tray 12. For final attachment of the lens holder 13 to the optics tray 12, four screws 125 are screwed into the through holes 126 and fixate the lens bracket 13 from below.

The front side of the housing 8 further provides additional threads 812a, 812b for fixating eventual accessories such as IR-PCBA and polarizing filters. The rib used to construct the heat dissipating surface 81 allows the thread 812a to be positioned thereon thus minimizing thread carrying profiles needed on the housing 8.

Alternatively or additionally, a single tray could simultaneously carry both a PCBA and an optical block. In this situation a choice on the side of the housing (back or front) is needed and the reference of the tray in Z-direction would be made to one of the sides not to overdetermine the mounting of the tray. In this situation the solution of referencing to the back side may be used and in addition a positional key may be placed at the front, wherein the positional key at the front may not reference the Z direction to avoid overdetermination.

It may also be possible to install the trays from opposite sides so that the solution explained above for the PCBA tray is used on both sides and no positioning key is required.

Summarizing, the proposed invention allows to fixate trays that can carry printed circuit board assemblies (PCBAs) with heat-loads that need to be dissipated and/or optical blocks inside an extruded profile serving as housing such that the heat load is dissipated efficiently while ensuring sufficient positioning robustness and accuracy of the trays to a front or backcover attached to the housing.

What is claimed is:

1. A camera head assembly for a camera comprising a camera housing and at least one tray,
    wherein the housing comprises at least one reference surface on an inner surface of the housing, and the at least one tray comprises at least one reference surface corresponding to the reference surface of the housing,
    wherein the at least one tray is arranged inside the housing such that the at least one reference surface of the housing and the at least one reference surface of the at least one tray abut each other, and such that the tray is clamped between a first surface of the housing and a second surface of the housing,
    wherein the at least one tray comprises a clamping arrangement for clamping the at least one tray between the first and the second surface of the housing,
    wherein the clamping arrangement includes a screw with a corresponding nut or a stud-weld-screw with a corresponding nut,
    wherein the screw with the corresponding nut is disposed between the first and the second surface or the stud-weld-screw with the corresponding nut is disposed between the first and the second surface.

2. The camera head assembly according to claim 1, wherein the housing comprises an extruded profile, and/or the at least one tray comprises a sheet metal part.

3. The camera head assembly according to claim 1, wherein the at least one tray comprises a fixation arrangement for fixing the at least one tray to the housing.

4. The camera head assembly according to claim 3, wherein the clamping arrangement is arranged on a side of the at least one tray opposite a side at which the fixation arrangement is arranged.

5. The camera head assembly according to claim 1, wherein the at least one tray comprises a bend providing an opening through which at least one electrical connector of the camera is guided.

6. The camera head assembly according to claim 1, wherein the at least one tray is configured to carry at least one printed circuit board assembly and/or at least one optical block of the camera.

7. The camera head assembly according to claim 1, wherein the housing comprises at least one rib extending in a longitudinal direction of the housing on the inner surface of the housing, and the reference surface of the housing is disposed on the rib.

8. The camera head assembly according to claim 1, wherein the housing comprises a positioning key for pre-fixing the tray in a predetermined position, wherein the reference surface of the housing is disposed on the positioning key.

9. The camera head assembly according to claim 1, further comprising
    a back cover attached to the housing at a first predetermined position, and
    a front cover attached to the housing at a second predetermined position, wherein
    a position of the reference surface of the housing is related to the first predetermined position and/or related to the second predetermined position.

10. The camera head assembly according to claim 9, wherein the back cover comprises an opening for accommodating an electrical connector, and a lid attached to an outer side of the back cover for covering the opening in the back cover, the lid comprising at least one connection socket providing access to the electrical connector.

11. A camera comprising the camera head assembly according to claim 1, a swivel mechanism mechanically connected to the camera head assembly for orientating the camera head assembly, and a base mechanically connected to the swivel mechanism for attaching the camera at a support structure.

12. A method for installing the camera head assembly according to claim 1 comprising the steps:
    arranging the at least one tray inside the housing by abutting the at least one reference surface of the housing to the corresponding at least one reference surface of the at least one tray, and
    arranging the screw with the corresponding nut to be disposed between the first surface and the second surface or the stud-weld-screw with the corresponding nut to be disposed between the first surface and the second surface, and
    clamping the at least one tray between the first and the second surface of the housing.

13. The camera head assembly according to claim 1, wherein the corresponding nut of the screw or of the stud-weld-screw abuts one of the first surface or the second surface.

14. The camera head assembly according to claim 1, wherein the corresponding nut of the screw or of the stud-weld-screw is configured to be untightened such that the at least one tray is clamped between the first and the second surface of the housing.

15. A camera head assembly for a camera comprising a camera housing and at least one tray,
- wherein the housing comprises at least one reference surface on an inner surface of the housing, and the at least one tray comprises at least one reference surface corresponding to the reference surface of the housing,
- wherein the at least one tray is arranged inside the housing such that the at least one reference surface of the housing and the at least one reference surface of the at least one tray abut each other, and such that the tray is clamped between a first surface of the housing and a second surface of the housing,
- wherein the housing comprises a positioning key for pre-fixing the tray in a predetermined position, wherein the reference surface of the housing is disposed on the positioning key.

\* \* \* \* \*